UNITED STATES PATENT OFFICE.

BENJAMIN PAYN, OF ALBANY, NEW YORK.

IMPROVEMENT IN COLORING AND CURING TOBACCO-STEMS.

Specification forming part of Letters Patent No. 22,668, dated January 18, 1859.

*To all whom it may concern:*

Be it known that I, BENJAMIN PAYN, of the city and county of Albany, and State of New York, have invented a new and useful Improvement in the Art of Coloring and Curing Tobacco-Stems; and I hereby declare the following to be a full and exact description thereof.

The nature of my invention relates to the coloring and curing of tobacco-stems by subjecting them to the action of steam, whereby the use of deleterious substances commonly used for such purposes—such as black-lead, charcoal-dust, &c.—is avoided, the quality of the tobacco is improved, and the subsequent processes of preparing it for the "cutting-machine" are rendered much easier.

The following description will enable others skilled in the art to use my improvement:

The stems, stripped from the leaves in the usual manner, are placed loosely upon a grated platform in a close room. Steam (from the exhaust-pipe of an engine being sufficient) is then admitted under the grated platform and passes freely through the heap of stems, and by its action dissolves the thick gummy juices they contain, rendering them soft and pliable and giving to them a rich brown color, closely resembling the leaf itself. It also takes from them such of their fermenting properties as tend to produce heating and sweating, so injurious to stems prepared in the usual manner, and which tend to rot the cut tobacco unless it is allowed to remain loose for several months before it is packed, whereas by my improved process it can be packed almost immediately after cutting. The stems require, to produce these effects, to be subjected to the action of steam for the space of about forty hours, and its action may be continuous or intermittent without producing any perceptible difference in its effect. These effects are not dependent upon any particular pressure of the steam used, but upon the warmth and moisture of the vapor.

Among the advantages that I claim for my improvement are its cheapness, its saving in time, and the improved quality of the cut tobacco as compared with that prepared by other processes.

What I claim as my invention, and desire to secure by Letters Patent, is—

Coloring and curing tobacco-stems at one operation by subjecting them to the action of steam, as and for the purposes herein set forth.

BENJAMIN PAYN.

Witnesses:
WM. H. LOW,
J. M. NAUGHTON.